US011574270B1

(12) United States Patent
Chee (10) Patent No.: US 11,574,270 B1
(45) Date of Patent: Feb. 7, 2023

(54) METHODS AND SYSTEMS FOR WORKPLACE RISK ASSESSMENT

(71) Applicant: LifeBooster Inc., Vancouver (CA)

(72) Inventor: Lawrence Chee, Vancouver (CA)

(73) Assignee: LifeBooster Inc., Vancouver (CA)

( * ) Notice: Subject to any disclaimer, the term of this patent is extended or adjusted under 35 U.S.C. 154(b) by 42 days.

(21) Appl. No.: 16/531,177

(22) Filed: Aug. 5, 2019

Related U.S. Application Data (60) Provisional application No. 62/716,250, filed on Aug. 8, 2018.

(51) Int. Cl.
*G06Q 10/06* (2012.01)
*G06N 20/00* (2019.01)

(52) U.S. Cl.
CPC ......... *G06Q 10/0635* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2010/0228584 A1 | 9/2010 | Nash | |
| 2014/0074546 A1* | 3/2014 | Poletti | G06Q 10/06314 705/7.28 |
| 2016/0098653 A1* | 4/2016 | Hojby | G06Q 10/06393 705/7.28 |
| 2016/0148132 A1* | 5/2016 | Aqlan | G06Q 10/0635 705/7.16 |
| 2017/0245806 A1* | 8/2017 | Elhawary | A61B 5/1122 |
| 2017/0296129 A1* | 10/2017 | Petterson | A61B 5/7278 |
| 2020/0000414 A1* | 1/2020 | McCord | G06Q 10/0635 |
| 2020/0375505 A1* | 12/2020 | Srinivasan | G08B 21/0492 |

FOREIGN PATENT DOCUMENTS

WO    WO-2018032089 A1 *  2/2018  ........... A61B 5/0022

OTHER PUBLICATIONS

Carneiro, et al., "New Methods for Stress Assessment and Monitoring at the Workplace," Date of Publication: Apr. 28, 2017, IEEE Transactions on Affective Computing, vol. 10, No. 2, pp. 237-254, Apr. 1-Jun. 2019, doi: 10.1109/TAFFC.2017.2699633. (Year: 2017).*
International Search Report and Written Opinion in corresponding International Patent Application No. PCT/CA2019/051082, dated Sep. 19, 2019.

(Continued)

*Primary Examiner* — Chesiree A Walton
(74) *Attorney, Agent, or Firm* — Dergosits & Noah LLP; Todd A. Noah (57) ABSTRACT

Systems and methods are provided for evaluating workplace risk by associating sensors with individual members of a workforce to measure conditions affecting the individual. Data is obtained from the sensors for reoccurring work periods for each individual so that a risk analysis may be performed to derive a risk score. Probability of injury is calculated aggregating risk scores for multiple reoccurring work periods. The calculated probability of injury is used to quantify workplace risk for the at least one individual and an enterprise risk assessment is provided by combining the quantified risks for each individual.

20 Claims, 5 Drawing Sheets

(56) References Cited

OTHER PUBLICATIONS

Nath, Nipun Deb, "Construction Ergonomic Risk and Productivity Assessment Using Mobile Technology and Machine Learning," Missouri State University—Graduate Theses, Spring 2017.
Mingers, John, "Multimethodology: Theory and Practice of Combining Management Science Methodologies," in Multi-Paradigm Multimethodology, pp. 1-20, 1997.

* cited by examiner

METHODS AND SYSTEMS FOR WORKPLACE RISK ASSESSMENT

RELATED APPLICATIONS

This application claims priority to and the benefit of U.S. Provisional Patent Application No. 62/716,250, filed Aug. 8, 2018, the contents of which are incorporated by reference in their entirety.

FIELD OF THE PRESENT DISCLOSURE

The present disclosure relates generally to methods and systems for evaluating risk factors in a workplace environment and more particularly to providing quantified assessments for single individuals as well as the workforce in aggregate by expressing a risk cost.

BACKGROUND

Workplace safety directly or indirectly affects virtually every member of society. Despite concerted attempts to improve conditions, workplace injuries represent a significant source of economic loss resulting from wage and productivity reductions, medical expenses, administrative costs, damage, uninsured costs and others. Thus, there are significant needs to provide continuous and real time assessment of the potential cost and recordable incidents of workplace injury for a single employee, and the potential cost and recordable incidents on workplace injury for all employees within an enterprise. Accordingly, this disclosure is directed to systems and methods for workplace risk assessment that meet these and other needs.

SUMMARY

This disclosure includes a method for evaluating workplace risk that involves, for individual members of a workforce, associating at least one sensor with each individual, wherein the at least one sensor is configured to measure conditions affecting the individual. Data may be obtained from the at least one sensor for reoccurring work periods for each individual. For each work period, a risk analysis may be performed based at least in part on the obtained data to derive a risk score. A probability of injury may be calculated by aggregating risk scores for multiple reoccurring work periods. The calculated probability of injury may be used to quantify workplace risk for the at least one individual. An enterprise risk assessment may be provided by combining the quantified risks for each individual.

In one aspect, the quantified workplace risk may include a risk of injury safety cost (RISC). Further, the quantified workplace risk may also include a reportable incident count (RIC). The enterprise risk assessment may be an aggregation of the RISC and RIC values for each individual.

In one aspect, performing the risk analysis may include independently applying a plurality of methodologies in parallel and merging outputs of the plurality of methodologies to derive the risk score. Deriving the risk score may also include extrapolating the risk analysis to represent a uniform length of time. The risk score may be a numeric value representing the degree of risk a specific body part of the individual will be injured. Each methodology may be at least one of a published methodology, a local methodology, an evolved methodology and an artificial intelligence methodology. A conforming operation and/or a localizing operation may be performed in conjunction with at least one of the plurality of methodologies.

In one aspect, the obtained data may be translated before performing the risk analysis. Translating the obtained data may include independently performing a plurality of transformation operations in parallel. Translating the obtained data may also include identifying at least one activity performed by the individual.

This disclosure also includes a system for evaluating workplace risk having a plurality of sensors associated with individual members of a workforce, wherein each sensor is configured to measure conditions affecting the individual and processing resources. The processing resources may be configured to obtain data from the sensors for reoccurring work periods for each individual, for each work period, perform a risk analysis based at least in part on the obtained data to derive a risk score, calculate a probability of injury by aggregating risk scores for multiple reoccurring work periods, use the calculated probability of injury to quantify workplace risk for each individual; and provide an enterprise risk assessment by combining the quantified risks for each individual.

In one aspect, the quantified workplace risk may be a risk of injury safety cost (RISC) and a reportable incident count (RIC) and wherein the enterprise risk assessment comprises an aggregation of the RISC and RIC values for each individual.

In one aspect, processing resources may be further configured to translate the obtained data before performing the risk analysis In one aspect, the sensors may be at least one of a motion sensor, an environmental sensor, a physiological sensor and a position sensor.

This disclosure also includes a computer program product for evaluating workplace risk. The computer program product can be a non-transitory computer readable storage medium having program instructions embodied therewith, the program instructions executable by at least one processor to cause the at least one processor to obtain data from a plurality of sensors, wherein each sensor is associated with individual members of a workforce, wherein each sensor is configured to measure conditions affecting the individual and wherein the obtained data is for reoccurring work periods for each individual, for each work period, perform a risk analysis based at least in part on the obtained data to derive a risk score, calculate a probability of injury by aggregating risk scores for multiple reoccurring work periods, use the calculated probability of injury to quantify workplace risk for each individual and provide an enterprise risk assessment by combining the quantified risks for each individual.

In one aspect, the quantified workplace risk may be a risk of injury safety cost (RISC) and a reportable incident count (RIC) and wherein the enterprise risk assessment comprises an aggregation of the RISC and RIC values for each individual.

In one aspect, the program instructions may further cause the at least one processor to translate the obtained data before performing the risk analysis.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings. These and similar directional terms should not be construed to limit the scope of the disclosure in any manner.

Unless defined otherwise, all technical and scientific terms used herein have the same meaning as commonly understood by one having ordinary skill in the art to which the disclosure pertains.

As used in this specification and the appended claims, the singular forms "a, "an," and "the" include plural referents unless the content clearly dictates otherwise.

Figure 1:
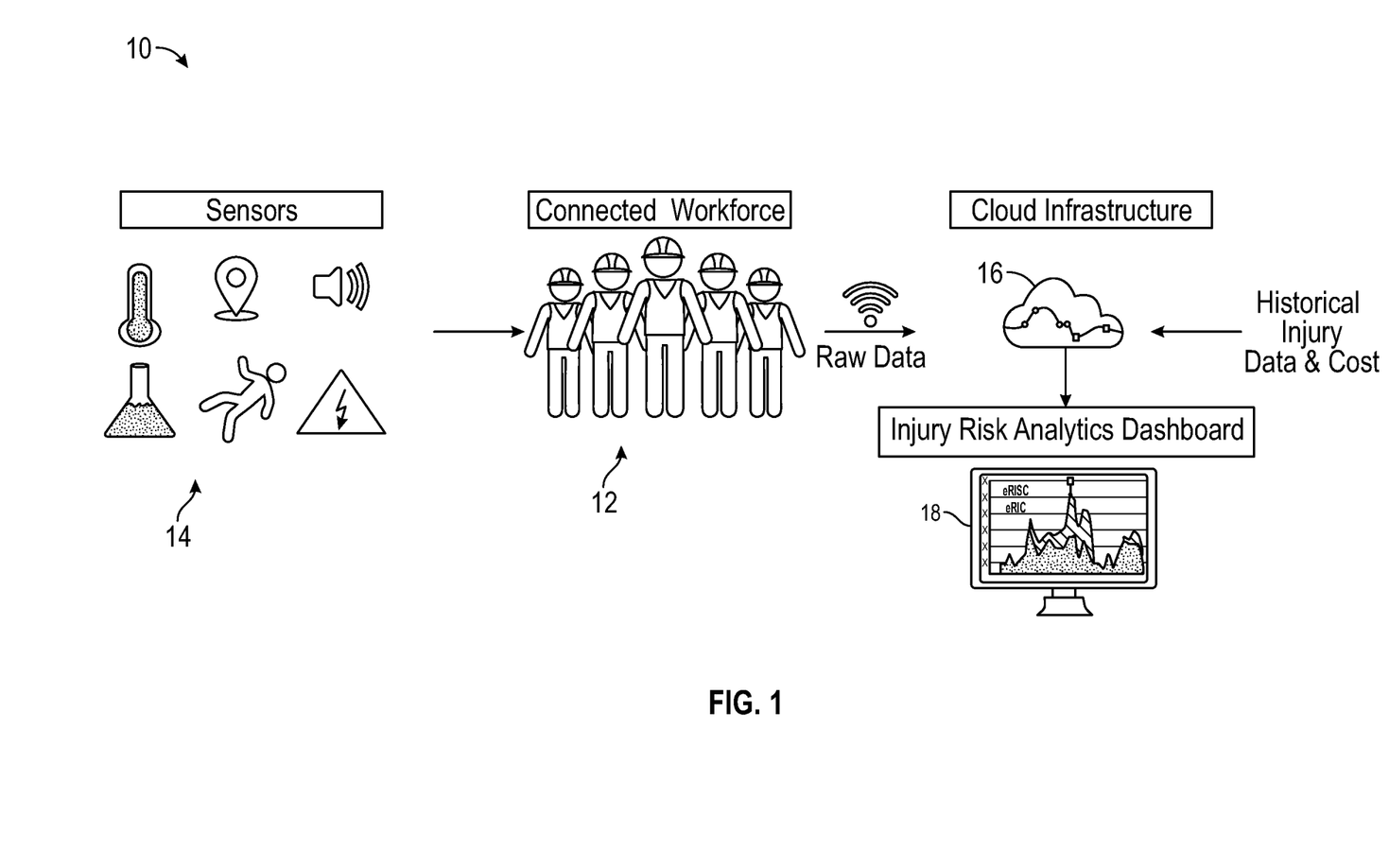
FIG. 1 schematically depicts an overview of a workplace risk assessment system, according to an embodiment of this disclosure.

The following materials include descriptions of the systems and methods of this disclosure as they relate to the quantification of costs associated with workplace injury by utilizing direct measurements of employee's body dynamics and the surrounding environment. Notably, the cost evaluation may represent the total expected costs for the entire workforce in some embodiments. As will be described, the quantified costs may reflect probability and type of injury and/or potential reportable incidents. To help illustrate, FIG. 1 schematically depicts an overview of an exemplary system 10 embodying aspects of the techniques of this disclosure. As indicated, members of the workplace population 12 to be evaluated may each be equipped with one or more sensors 14 to provide raw data that may include measurements of the conditions affecting each individual member of the workforce, such as movement and actions of the individual and/or environmental and ambient conditions concerning each individual. Accordingly, the sensors may be integrated into one or more devices that may be worn or otherwise associated with each individual so as to allow real time capture of information that may be used to evaluate risk and quantify costs. As will be appreciated, many different types of sensors may be used to gather the relevant information. By way of illustration and without limitation, suitable sensors include motion sensors (e.g., accelerometers, gyroscopes, magnetometers, and altimeters), environmental sensors (e.g., light sensors, proximity sensors, temperature sensors, pressure sensors, radiation sensors, smoke sensors, air quality sensors, chemical sensors, acoustic sensors, optical sensors for recording video or still images, infrared sensors, ultraviolet sensors and ultrasonic sensors), physiological sensors (blood pressure sensors, heart rate monitors, ECG monitors, thermometers, galvanic sensors, oximetry sensors, stress level sensors and respiration sensors) and others. According to the techniques of this disclosure, sensors 14 may also include systems configured to determine absolute or relative position, such as satellite-based or wireless communication-based strategies.

As will be appreciated, sensors 14 may be integrated with one or more devices that are either dedicated to obtaining information for use in the risk assessment techniques of this disclosure or may be multifunctional devices serving any additional desired purpose. Non-limiting examples include a mobile phone, a tablet, a personal digital assistant (PDA), a navigator, a remote control, an activity tracker, virtual or augmented reality equipment, a mobile internet device (MID), a camera, a video camera, and the like. The device may also be configured to be associated with the individual in a specific manner, such as by being wearable (e.g., glasses, watch, belt clip, strapped to a body part), pocketed in either the individual's clothing or equipment (e.g., back pack), or may be a handheld device. Further, any combination of the above device characteristics are also possible. In one aspect, the device(s) may have customized suites of sensors depending on the environment and tasks expected to be performed by the individual.

The raw data and other measured information used for performing the risk assessments obtained by sensors 14 may be communicated to processing resources for analysis, such as cloud infrastructure 16 as indicated in the depicted embodiment. The processing resources may be provided on site for dedicated use in a given workplace, may be remote to allow centralized administration of multiple workplaces or may employ a mixed architecture with processing operations distributed among multiple remote and/or local installations. The sensor data and information may be sent to cloud infrastructure 16 or other processing resources using any suitable wireless or wired communication protocol. Exemplary wireless protocols may include cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Alternatively or in addition, various serial or parallel wired protocols may be used, such as in embodiments for which the device(s) with the integrated sensors are docked for recharging after a defined work period.

As indicated, cloud infrastructure 16 or the other processing resources may have access to additional information, such as historical injury data and costs that may be specific to a particular workplace or location, may have more general applicability or may be any combination of these. Further, in some embodiments, the processing resources may perform a translation function to cast the obtained data in a form suitable for application of relevant ergonomic guidelines. For example, historical guidelines may be based on different sensors or technologies, but may still provide relevant standards against which to compare the obtained sensor data. Such translation may also help serve to provide more uniform evaluations of risk. It should be recognized that such translation may also be performed by the device(s) with the integrated sensors or both. As will be described in further detail, the operations performed by cloud infrastructure 16 to assess workplace risk may include performing an ergonomic assessment for each individual, which may then be combined with the historical injury data information to derive the probability of an injury for each significant body part. Correspondingly, the probability of an injury of each body part may be applied to the historical costs of injury of said body parts, resulting in an individual Risk of Injury Safety Cost (RISC) value. In a further aspect, mapping the probability of an injury of each body part to published reportable incidents forms provides an individual Reportable Incident Count value (RIC). The RISC and RIC of each assessed individual can be extended to the entire enterprise resulting in an eRISC and eRIC value, that may be displayed or otherwise communicated via a suitable user interface, such as analytics dashboard 18 as shown in FIG. 1. Dashboard 18 may also be used to convey any related information, such as the individual ergonomic assessments or individual risk assessments as desired.

As will be appreciated, the processing resources used in conjunction with the techniques of this disclosure may involve one or more processors configured to receive the relevant information as input, including from sensors 14, and to perform the various operations described in the following materials to provide the risk assessment. The operations may be in the form of instructions, programmed in software, to carry out the desired functions. This software may be downloaded to the computer in electronic form, over a network, for example. Alternatively or additionally, the software may be stored on tangible media, such as optical, magnetic or electronic memory media. As such, the stored instructions may be read and executed by one or more processors, and may be implemented using any desired combination of software, hardware and firmware, including but not limited to, application software, firmware, resident software, microcode, etc. Some embodiments may take the form of a computer program product accessible from a computer-usable or computer-readable medium providing program code for use by or in connection with a computer or any instruction execution system. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, such as in the form of cloud infrastructure 16, allowing for widely distributed computing and encompassing many different networks, though any network infrastructure can be used for exemplary communications made incident to the techniques as described in various embodiments.

Figure 2:
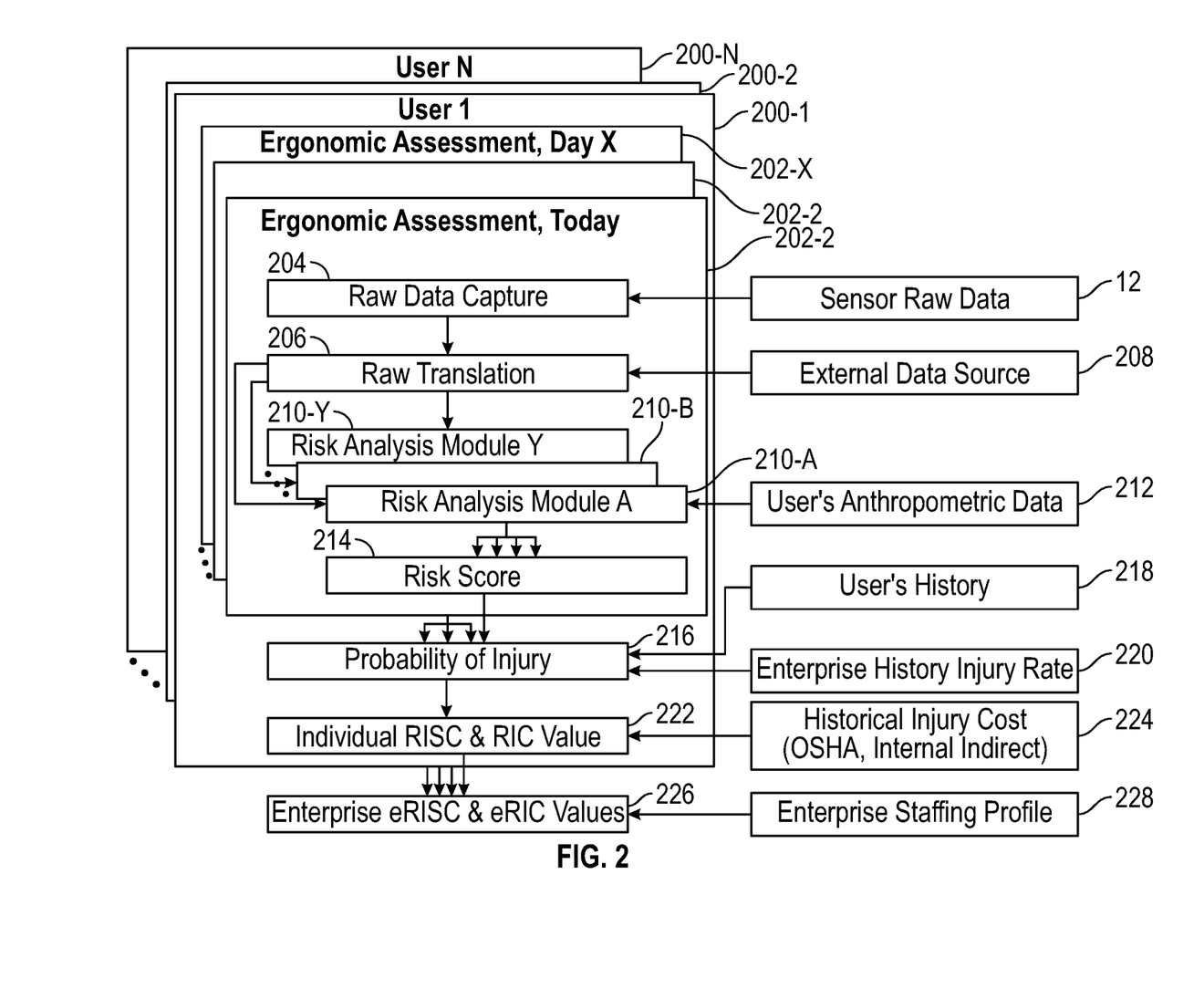
FIG. 2 schematically depicts a suitable process flow for assessing workplace risk, according to an embodiment of this disclosure.

To help illustrate the concepts discussed above, one suitable process flow that may be performed by cloud infrastructure 16 is schematically depicted in FIG. 2. As noted above, an assessment may be performed for each relevant workplace individual 200-1, 200-2 . . . 200-N. With respect to this element and the other multiple elements of the disclosure, the number of elements are denoted as a series ending in a variable designated with an alphanumeric character. Although different alphanumeric characters are employed to help distinguish among the elements for convenience, these variables should be understood to represent any desired number of elements and do not imply any greater or lesser quantity with respect to the other elements. The individual assessments are further divided into days 202-1, 202-2, . . . , 200-X or other suitable reoccurring work periods, shifts or other divisions of time as warranted, beginning with the most recent and becoming progressively older over the desired length of time, such as the past week, month, year or longer. Accordingly, multiple assessments may be performed on multiple individuals in parallel, and may be performed multiple times a day, on a daily basis, on a schedule (every day for a month followed by two months absence, repeat), or on any desired ad hoc basis.

Each ergonomic assessment is made for the relevant reoccurring work period, such as each day in the depicted embodiment. An "Ergonomic Assessment" is defined as a single continuous period of observation of a single individual over a given reoccurring work period, resulting in a numerical risk score that represents a degree of risk of injury. Each assessment may include up to four general operations as indicated, raw data capture 204, raw data translation 206, risk analysis using one or more modules 210-A, 210-B, . . . , 210-Y, and the assignment of risk score 214 for each individual over each period. Illustrative details regarding these operations are discussed in the following sections.

The process flow indicated in FIG. 2 begins with data obtained from sensors 14 being input as raw data capture 204. Raw data capture 204 may include the process of collecting timestamped sensor data from individually worn or associated body sensors 14. As indicated above, the sensors 14 capture information such as body dynamics such as body segment motion, body temperature, heart rate, galvanic skin response (GSR), electromyograms (EMG) and the like. Sensors 14, whether integrated in the same or multiple devices, can also capture environmental conditions such as sound levels, air particulate, gas (CO, $CO_2$, etc.), ambient temperature, humidity, pressure, radiation dosimeter, electric field, as well as positional information from a global navigation satellite system (GNSS) such as the Global Positioning System (GPS) or GLONASS, or a wireless positioning systems as noted above. A single capture collects the raw data over a continuous period of time, from several minutes to the entire work shift. The data, once collected, may be stored in a centralized repository such as in secure cloud infrastructure 16. As warranted, the data may be organized such that it enables compliance to the United States Health Insurance Portability and Accountability Act (HIPAA) and European General Data Protection Regulation (GDPR) privacy rules and regulations.

Figure 3:
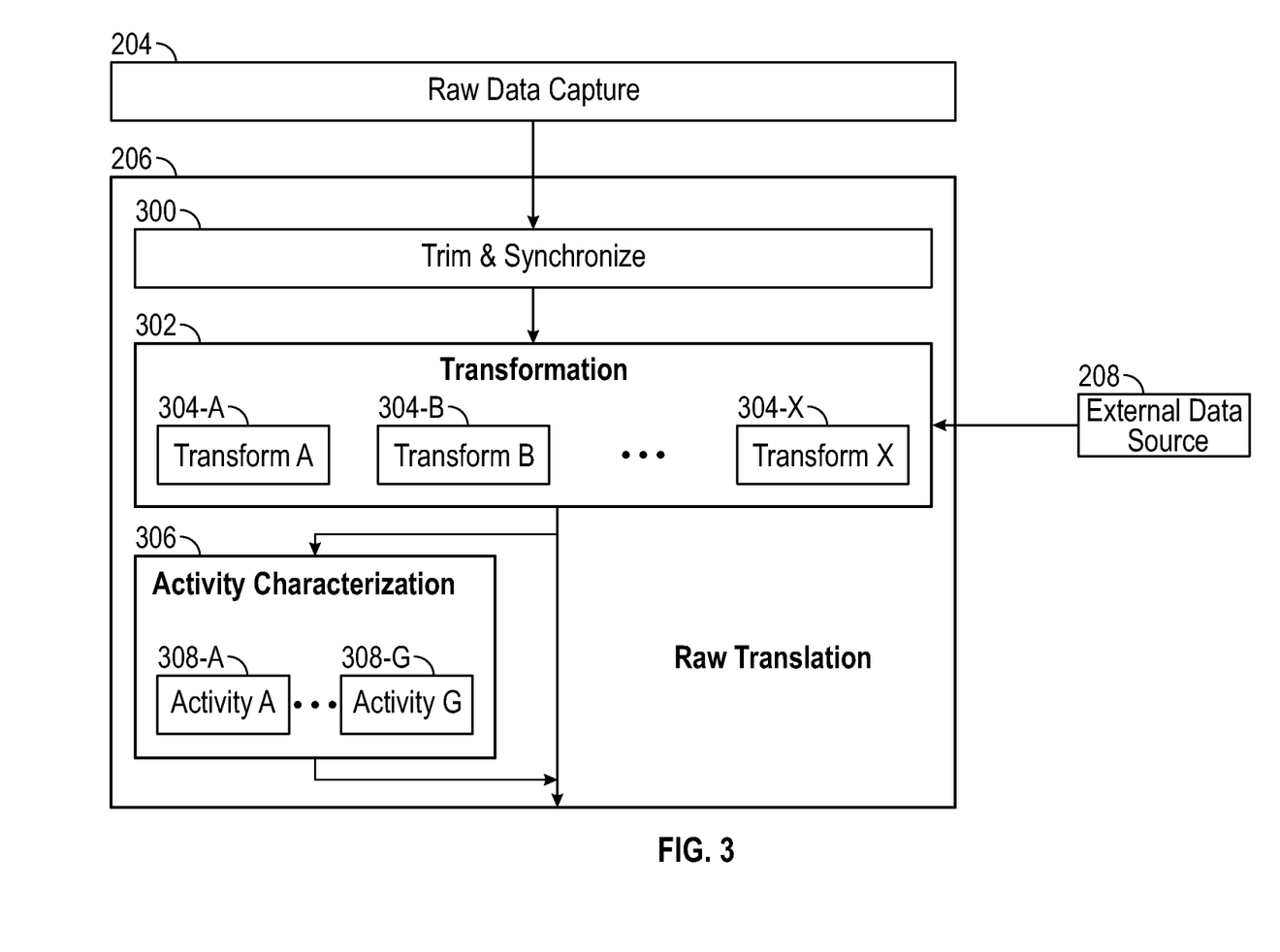
FIG. 3 represents aspects associated with translating sensor data before performing risk analysis, according to an embodiment of this disclosure.

Next, translation 206 may be performed for some or all of the input data to allow direct application of existing ergonomic guidelines, optionally using information from external data source 208. Thus, raw translation generally refers to the process of converting sensor data and external data sources into a form that can be readily analyzed. Examples of external data sources 208 include land surveys and weather records that can be retrieved on demand via cloud to cloud interactions or other suitable communication techniques. Depending on the embodiment, translation may include one or more aspects as schematically depicted in FIG. 3. Following raw data capture 204, translation 206 may first involve data trimming and/or synchronization 300. Trimming refers to the removal of extraneous information from the start and/or end of the raw data capture. The result is a raw data capture that encompasses a time period that is specific to the current risk assessment. An example of extraneous data is information corresponding to times before and after a work shift. Synchronization refers to the conversion of multiple, parallel, asynchronous streams of time stamped raw sensor data into fully synchronous data using any suitable interpolation techniques. Next, transformation 302 may be performed after the raw data has been trimmed and synchronized. Transformation 302 is configured to reduce errors, increases accuracy and otherwise convert the data into time stamped "real world units." As indicated, multiple transformation modules 304-A, 304-B, . . . , 304-X may operate in parallel, independently of each other. Examples of the functions performed by respective transformation modules include: converting orientation data into body motions as outlined in U.S. Pat. No. 6,820,025, which is hereby incorporated by reference in its entirety; converting accelerometer data into vibration metrics as defined by International Organization for Standardization (ISO) 5349-1:2001; increasing the accuracy of three dimensional positional information by combining GNSS, accelerometer, local ambient pressure and altitude data from land surveys retrieved from an external data source; converting all motion data into energy burn/caloric consumption values; as well as other suitable operations. As warranted, the various transformation operations 302 may employ relevant information obtained from external data sources 208 as noted above. Following transformation, activity characterization 306 may be performed to identify one or more activities 308-A, . . . , 308-G. Using the transformed data as input, activity characterization involves pattern recognition to identify actions taken by each individual. The identification may involve one or more activities, that may be recognized in parallel and independently of each other. Examples of suitable activities include lifting an object, pushing/pulling a cart, walking, running, climbing stairs, sitting in vehicle. The output of activity characterization 306 are activity epochs that define the start and end times of the identified activity.

Returning to FIG. 2, once the operations associated with data translation 206 have been performed, risk analysis for each individual over the relevant time period may be performed using the translated data with one or more risk analysis modules 210-A, 210-B, . . . , 210-Y, each of which may also have anthropometric data 212 for the individual as an additional input. As shown in greater detail in FIG. 4, risk analysis processes the transformed and activity epoch data for risk of injury in a single capture. The output of the risk analysis is a numeric risk value for each body part. As noted, multiple risk analysis modules 210-A, 210-B, . . . , 210-Y may be employed, each of which may operate in parallel, independently of each other. Each risk analysis module 210 is composed of up to three functional operations, methodology, conforming and localizing. Each risk analysis module 210 is associated a specific methodology 400-A, 400-B, 400-C, . . . , 400-H, while one or more of the conforming and localizing operations may optionally be applied as warranted, such as indicated by conforming 402-B and 402-H included with risk analysis modules 210-B and 210-H, respectively, and localizing 404-C and 404-C included with risk analysis modules 210-C and 210-H, respectively. The objective of methodology 400 is to identify and quantify risks. Some methodology 400 will require additional information such as a user's anthropometric data 212, which may be measured and recorded prior to the first raw data capture. Advantageously, in embodiments featuring a cloud-based architecture, the number and types of modules 210 may readily be accessed depending on the needs and characteristics of the workplace being evaluated. Likewise, modules 210 may easily be updated in response to new or additional information in order to improve the quality of the risk assessment.

Figure 4:
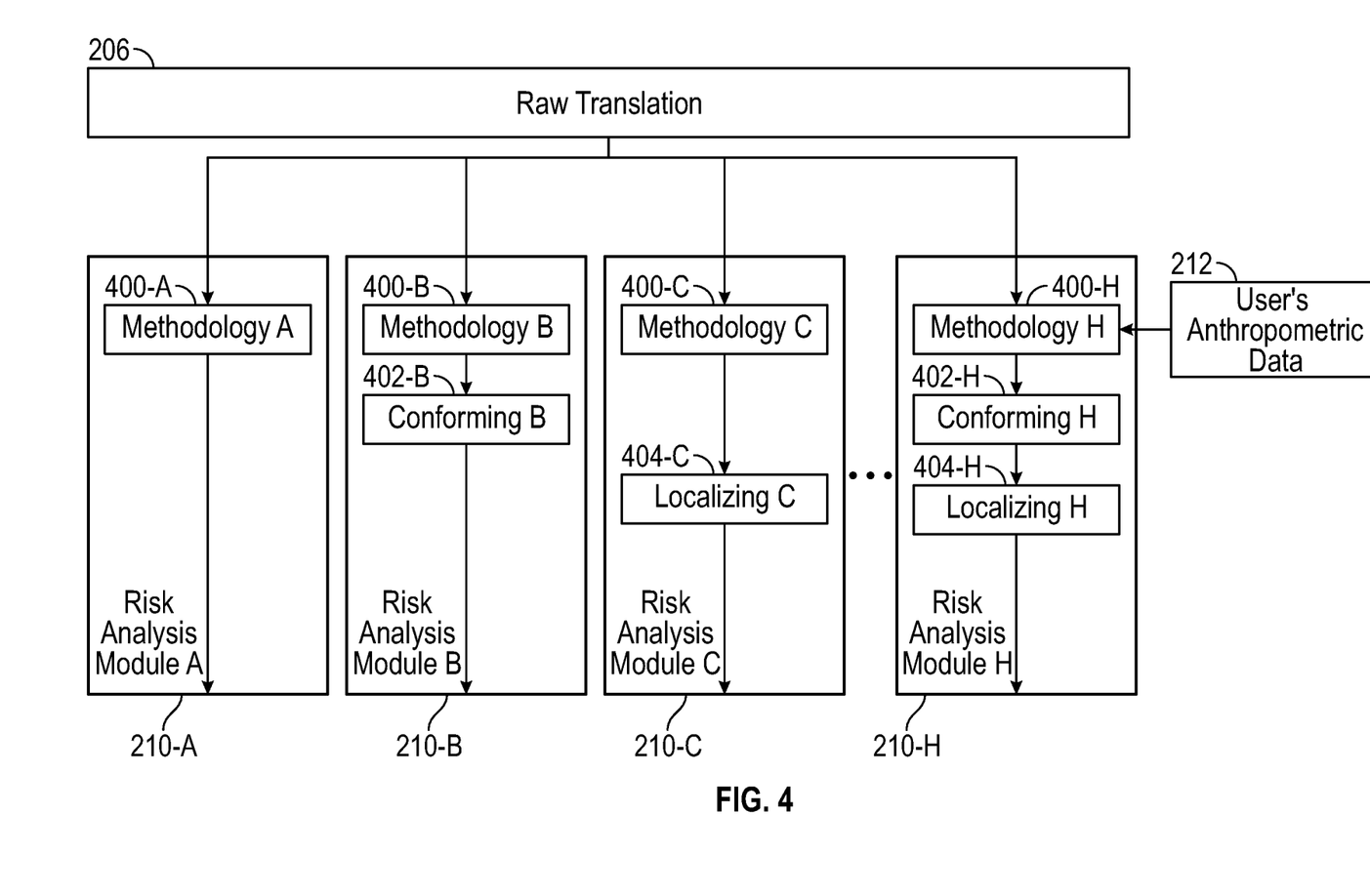
FIG. 4 represents aspects associated with performing risk analysis using multiple methodologies in parallel, according to an embodiment of this disclosure.

The methodology 400 of each risk analysis module 210 may generally be one of four categories: published; local; evolved; and artificial intelligence. Published methodologies are documents provided by government entities, insurance companies, and research papers. The documents provide explicit rules to identify and quantify risks, with representative examples including National Institute for Occupational Safety and Health (NIOSH) lift, WorkSafe British Columbia (WSBC) Directive C4-2 repetitive motions, ISO body and hand vibration. As will be appreciated, these correspond to methodologies used in a conventional manner by an ergonomist to manually identify risk in the workplace and then applied to employees. According to the techniques of this disclosure, the digitized data from sensors 14 as captured 204 and translated 206 may be applied directly to these methodologies to leverage decades worth of proven and existing knowledge. Further, methodologies may also be based on knowledge of "local" needs. Local needs could represent special working conditions and demands of a specific workplace under assessment, to be applied to all employees in a local department. Local needs could also represent the special restrictions in movement of an employee recovering from an injury, as defined by the employee's custom Return To Work (RTW) program. The local methodologies could originate from published documents, and furthermore be customized with different operating parameters. For example, C4-2 identifies shoulder flexion in excess of 60 degrees from vertical to be a risk and a corresponding local need of a recovering employee may require a risk to be identified when the shoulder flexion exceeds 45 degrees. Next, evolved methodologies account for the expectation that over time, the injury rate will diminish considerably but injuries will still occur. With ongoing data captures, the raw data collected on an employee prior to a given injury can be reviewed for gaps against the existing (at the time) risk identifying methodologies. The gaps, once identified, are addressed by creating a new evolved methodology. The evolved methodology could be based on existing published or local methodologies, or it could be derived with no reference to any existing methodologies. Finally, artificial intelligence (AI) methodologies allow improved identification of leading indicators of workplace injury. By combining injury data (when, where, type of injury etc.) with digitized data capture, the overall data set becomes an ideal learning condition for AI. The AI, used in conjunction with "traditional methodologies" outline above, can present an even more accurate means of predicting injury.

The option of performing a conforming 402 operation with a risk assessment module 210 reflects that the quantified output between each methodology will most likely have different unit of risk. For example, the NIOSH lift risk module generates a risk value called a lift index. A lift index with a value greater than 1.0 identifies a risk. For other methodologies, the risk value could be color levels green, yellow, orange and red for example representing increasing risk. Accordingly, conforming may be configured to make the unit value of quantified risk to be common across all methodologies.

Further, the option of performing a localizing 404 operation with a risk assessment module 210 accounts for the possibility that the type of methodology 400 may either provide the quantified risk for a specific body part, or it may provide a quantified risk for an area of the body that encompasses multiple body parts. For example, WSBC C4-2 identifies risks on a per joint basis whereas a risk analysis focused on body heat fatigue would identify the risk to the entire body. Correspondingly, localizing 404, when performed, transforms the quantified risks associated to an area of the body into multiple orthogonal quantified risks localized to each specific body part.

Figure 5:
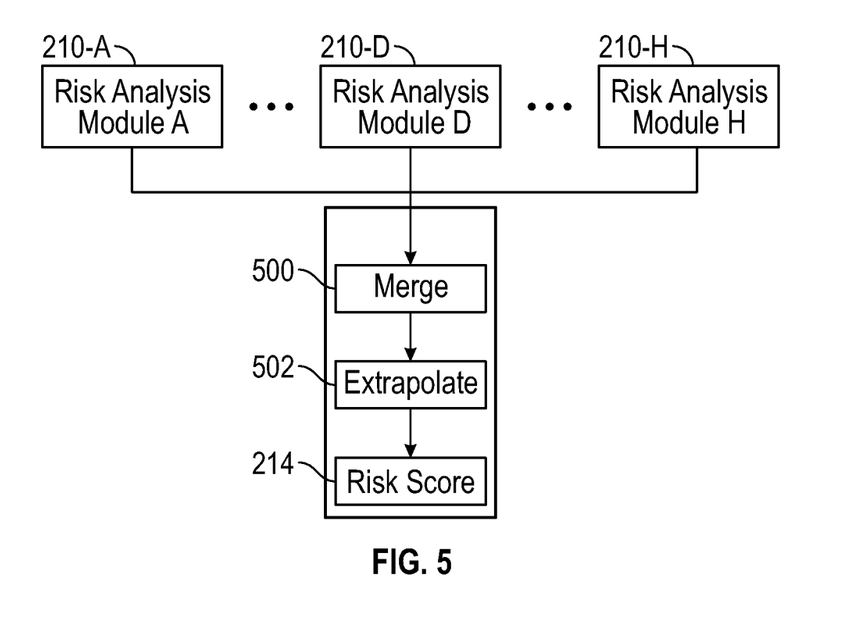
FIG. 5 represents aspects associated with deriving a risk score, according to an embodiment of this disclosure.

As indicated by FIG. 2, the output of risk analysis modules 210 is risk score 214, which is a numeric value representing the degree of risk a specific body part will be injured based on the raw data captured and resulting analysis from a single capture. Thus, risk score 214 is created based on the output results of all available risk analysis modules merged together followed by a normalizing function as schematically indicated in FIG. 5. In particular, it may be expected that many of risk modules 210 will be developed in isolation of other risk modules, as many of the published guidelines have been developed as such. Two situations can arise when combining two or more modules: complementary or overlapping. Complementary risk analysis modules are modules that identify risks on dissimilar joints. Overlapping risk analysis modules are modules that identify risks for the same joint. As such, a merge operation 500 may receive the output of each risk module 210 in order to generate a coherent risk value for every joint. Complementary modules are combined, while overlapping modules are identified and biased accordingly to avoid any "double" counting of risks. After merging, an extrapolate operation 502 may then facilitates comparison of the separate assessments, either for a single user or across multiple users, by increasing consistency between the various measures. A key parameter that is particularly desirable to be consistent between assessments is the time duration of an assessment. For example, two of the most common assessment comparisons performed are comparisons between work shifts and comparisons between job tasks. Either of these comparisons could be applied for a single employee, or a group of employees. A work shift represents an entire days' work, and a job task represents the time it takes to complete a specific job. Correspondingly, the extrapolate operation 502 is performed when the assessment only represents a fraction of target time duration. An example would be an assessment that only captures half the entire work shift. The extrapolate function would consider the timing, frequency and magnitude of the risks (risk profile) within the assessment and extrapolate the risk profile and corresponding risk score to estimate the risk score for an entire work shift. Further, the extrapolate operation 502 may handle an assessment capturing only a single job task in a similar manner, taking into account the positive contribution of a reduced risk profile of a rest period typically taken between the end of one job task and the start of another job task. Variability in the duration of the rest period and in the jobs performed within a single work shift may also be considered. This enables the ability to "design" a work shift by selecting an appropriate rotation of job tasks and an appropriate amount of rest between job tasks. As desired, the extrapolate operation 502 may be applied to represent a time duration of an entire seven day cycle (week), a 28 day cycle (month), 54 week cycle (year), as well as any other divisions of time or even a lifetime's worth of work. Thus, the application of the extrapolation function with such expanded time duration can be used to predict an injury due to long term cumulative effects.

Returning again to FIG. 2, once risk scores 214 have been determined for each day 200 (i.e., reoccurring work period or other assessment duration) for an individual, the probability of injury may be calculated to evaluate how likely that individual is to experience an injury to a specific body part. Accordingly, the probability calculation may take into account the risk score of all assessments, the user's history 218 and the enterprise's historical injury rate 220. For example, an individual who has had a recent series of consecutive high risk score assessments will have a much higher probability of an injury than an individual who just has a single day with a high risk score. Similarly, an individual who has suffered a recent injury will have a higher probability of another recurring injury. The inclusion of the enterprise's historical injury rate enables the appropriate bias in the probability calculation to account for intangibles such as a strong (or weak) safety corporate culture.

Based on the probability of injury 216, quantification of risk for an individual may then be made, such as in the form of individual RISC and RIC values 222. As noted above, the individual RIC value is the probability of a reportable incident occurring, which may be derived by summing all probabilities of injury per body part. Further, the individual RISC value determines the risk exposure of an individual's workplace injury, in monetary terms. The derivation of the individual RISC value may begin with the per body part RISC value. The per body part RISC value is generated by combining the probability of injury per body part with the injury cost per body part. Thus, the individual RISC value is the sum of the per body part RISC value, minus the indirect cost that is incurred when two or more joint injuries occur in a single incident. In one aspect, the injury cost per body part may be the cost associated with a specific body part when a workplace injury occurs. This cost can be broken down into direct and indirect costs. Direct cost are specific cost objects such as the medical cost resulting from an injury. The medical costs are published and are made publicly available by governmental entities (e.g. Occupational Safety and Health Administration (OSHA)) and insurance companies. The indirect costs are cost items that cannot be attributed to cost objects, such as administrative time spent managing the aftermath of an incident causing injury. The derivation of the indirect costs can be highly granular, down to specific employees as desired. By providing high granularity, the techniques of this disclosure may be employed to recognize the extensive monetary impact of key employees when a specific part of their body is injured and the employee is no longer able to perform their important function.

As will be appreciated, the per body part and individual RISC values are key performance indicators (KPI) that may be communicated to relevant parties, such as health and safety (H&S) managers for the enterprise. As noted above, communication of this information may be through webbased dashboard 18 or via any other suitable interface. The monetary unit of the KPIs provides the appropriate level of urgency and magnitude of the risk at hand. By providing the information through a common interface, rapid identification of individuals/teams/departments/sites/job types and joints most at risk in a large enterprise can occur. For example, the RISC values empower the H&S with the information necessary to prioritize, strategize and execute a mitigation plan to reduce/eliminate the risk of injury.

In addition to the per individual assessments discussed above, the techniques of this disclosure also include the aggregation of this information, such as in the form of enterprise eRISC and eRIC values. The eRISC value represents the enterprise wide risk exposure of workplace injury, in monetary terms. Consequently, the derivation of the eRISC value is the sum of the individual RISC values with the added extrapolation for all employees who have not had a recent (or any) risk assessment. The extrapolation process is performed by associating the individual RISC value of assessed employees with unassessed employees with similar job types.

Described herein are certain exemplary embodiments. However, one skilled in the art that pertains to the present embodiments will understand that the principles of this disclosure can be extended easily with appropriate modifications to other applications.

What is claimed is:

1. A method for evaluating individual and enterprise-wide workplace risk, comprising:
   a) configuring a plurality of sensors on at least one of a plurality of individual employees of a workforce, each of the plurality of sensors being respectively secured to a corresponding one of a plurality of specific body parts associated with the at least one individual employee, and configured to directly measure conditions affecting the corresponding body part;
   b) obtaining real-time data in parallel from each of the plurality of sensors associated with the at least one individual employee during reoccurring work periods;
   c) for at least one of the reoccurring work periods, performing a risk analysis with one or more risk analysis modules to derive a plurality of injury risk scores associated with the at least one individual employee, each of the one or more risk analysis modules performing one or more operations selected from the group of methodology, conforming or localizing, each of the derived plurality of injury risk scores being based upon one or more outputs of the one or more— risk analysis modules, wherein the outputs are merged and normalized when more than one risk analysis module is used, and further wherein each of the derived plurality of injury risk scores corresponds respectively to one of the measured body parts;
   d) determining a plurality of probabilities of injury of each of the measured body parts for the at least one individual employee, by aggregating the derived plurality of injury risk scores associated with the at least one individual employee during the at least one reoccurring work periods, to quantify a risk of injury for each of the measured body parts for the at least one individual employee;
   e) quantifying a workplace risk for the at least one individual employee by aggregating the determined plurality of probabilities of injury corresponding to the measured body parts associated with the at least one individual employee during the reoccurring work periods;
   f) deriving an enterprise-wide risk assessment of the workplace by aggregating the quantified workplace risk for the plurality of individual employees; and
   g) outputting one or more of the derived plurality of injury risk scores, the plurality of determined probabilities of injury or the enterprise-wide risk assessment of the workplace.

2. The method of claim 1, wherein the quantified workplace risk comprises a risk of injury safety cost (RISC).

3. The method of claim 2, wherein the quantified workplace risk further comprises a reportable incident count (RIC).

4. The method of claim 3, wherein the enterprise risk assessment comprises an aggregation of the RISC and RIC values for each individual employee.

5. The method of claim 1, wherein performing the risk analysis comprises independently applying a plurality of methodologies in parallel and merging outputs of the plurality of methodologies to derive the plurality of injury risk scores.

6. The method of claim 5, wherein deriving the plurality of injury risk scores further includes extrapolating the risk analysis to represent a uniform length of time.

7. The method of claim 5, wherein an injury risk score of the plurality of injury risk scores comprises a numeric value representing a degree of risk that a specific body part of the plurality of specific body parts associated with the individual employee will be injured.

8. The method of claim 5, wherein the plurality of methodologies comprises at least one of a published methodology, a local methodology, an evolved methodology and an artificial intelligence methodology.

9. The method of claim 8, further comprising performing a conforming operation in conjunction with at least one of the plurality of methodologies.

10. The method of claim 8, further comprising performing a localizing operation in conjunction with at least one of the plurality of methodologies.

11. The method of claim 1, further comprising translating the obtained real-time data before performing the risk analysis.

12. The method of claim 11, wherein translating the obtained real-time data comprises independently performing a plurality of transformation operations in parallel.

13. The method of claim 10, wherein translating the obtained real-time data includes identifying at least one activity performed by the individual employee.

14. A system comprising:
   one or more processors; and
   a non-transitory computer readable medium storing a plurality of instructions, which when executed, cause the one or more processors to:
   configure a plurality of sensors on at least one of a plurality of individual employees of a workforce, each of the plurality of sensors being respectively secured to a corresponding one of a plurality of specific body parts associated with the at least one individual employee, and configured to directly measure conditions affecting the corresponding body part;
   obtain real-time data in parallel from each of the plurality of sensors associated with the at least one individual employee during reoccurring work periods;
   for at least one of the reoccurring work periods, perform a risk analysis with one or more risk analysis modules to derive a plurality of injury risk scores associated with the at least one individual employee, each of the one or more risk analysis modules performing one or more operations selected from the group of methodology, conforming or localizing, each of the derived plurality of injury risk scores being based upon one or more outputs of the one or more risk analysis modules, wherein the outputs are merged and normalized when more than one risk analysis module is used, and further wherein each of the derived plurality of injury risk scores corresponds respectively to one of the measured body parts;

determine a plurality of probabilities of injury of each of the measured body parts for the at least one individual employee, by aggregating the derived plurality of injury risk scores associated with the at least one individual employee during the at least one reoccurring work periods, to quantify a risk of injury for each of the measured body parts for the at least one individual employee;

quantify a workplace risk for the at least one individual employee by aggregating the determined plurality of probabilities of injury corresponding to the measured body parts associated with the at least one individual employee during the reoccurring work periods;

derive an enterprise-wide risk assessment of the workplace by aggregating the quantified workplace risk for the plurality of individual employees; and output one or more of the derived plurality of injury risk scores, the plurality of determined probabilities of injury or the enterprise-wide risk assessment of the workplace.

15. The system of claim 14, wherein the quantified workplace risk comprises a risk of injury safety cost (RISC) and a reportable incident count (RIC) and wherein the enterprise risk assessment comprises an aggregation of the RISC and RIC values for each individual employee.

16. The system of claim 14, wherein processing resources are further configured to translate the obtained real-time data before performing the risk analysis.

17. The system of claim 14, wherein the plurality of sensors comprises at least one of a motion sensor, an environmental sensor, a physiological sensor, and a position sensor.

18. A computer program product, comprising a non-transitory computer-readable medium having computer-readable program code embodied therein to be executed by one or more processors, the program code including instructions to:

configure a plurality of sensors on at least one of a plurality of individual employees of a workforce, each of the plurality of sensors being respectively secured to a corresponding one of a plurality of specific body parts associated with the at least one individual employee, and configured to directly measure conditions affecting the corresponding body part;

obtain real-time data in parallel from each of the plurality of sensors associated with the at least one individual employee during reoccurring work periods;

for at least one of the reoccurring work periods, perform a risk analysis with one or more risk analysis modules to derive a plurality of injury risk scores associated with the at least one individual employee, each of the one or more risk analysis modules performing one or more operations selected from the group of methodology, conforming or localizing, each of the derived plurality of injury risk scores being based upon one or more outputs of the one or more risk analysis modules, wherein the outputs are merged and normalized when more than one risk analysis module is used, and further wherein each of the derived plurality of injury risk scores corresponds respectively to one of the measured body parts;

determine a plurality of probabilities of injury of each of the measured body parts for the at least one individual employee, by aggregating the derived plurality of injury risk scores associated with the at least one individual employee during the at least one reoccurring work periods, to quantify a risk of injury for each of the measured body parts for the at least one individual employee;

quantify a workplace risk for the at least one individual employee by aggregating the determined plurality of probabilities of injury corresponding to the measured body parts associated with the at least one individual employee during the reoccurring work periods;

derive an enterprise-wide risk assessment of the workplace by aggregating the quantified workplace risk for the plurality of individual employees; and output one or more of the derived plurality of injury risk scores, the plurality of determined probabilities of injury or the enterprise-wide risk assessment of the workplace.

19. The computer program product of claim 18, wherein the quantified workplace risk comprises a risk of injury safety cost (RISC) and a reportable incident count (RIC) and wherein the enterprise risk assessment comprises an aggregation of the RISC and RIC values for each individual employee.

20. The computer program product of claim 18, wherein the program instructions further cause the at least one processor to translate the obtained real-time data before performing the risk analysis.

* * * * *